United States Patent
Vandenbaviere et al.

(10) Patent No.: US 10,044,296 B2
(45) Date of Patent: Aug. 7, 2018

(54) MULTIAXIS DRIVE DEVICE AND CONTROL INSTRUMENT FITTED WITH SUCH A DEVICE

(75) Inventors: Yann Vandenbaviere, Boulogne Billancourt (FR); Francois Guillot, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 814 days.

(21) Appl. No.: 14/241,298

(22) PCT Filed: Aug. 16, 2012

(86) PCT No.: PCT/EP2012/066049
§ 371 (c)(1),
(2), (4) Date: Mar. 20, 2014

(87) PCT Pub. No.: WO2013/030008
PCT Pub. Date: Mar. 7, 2013

(65) Prior Publication Data
US 2014/0203685 A1    Jul. 24, 2014

(30) Foreign Application Priority Data

Sep. 2, 2011 (FR) .................... 11 57799

(51) Int. Cl.
| | |
|---|---|
| *H02N 2/18* | (2006.01) |
| *H02K 41/03* | (2006.01) |
| *H02N 2/00* | (2006.01) |
| *H02N 2/10* | (2006.01) |
| *H02K 1/34* | (2006.01) |
| *H02K 7/09* | (2006.01) |
| *G05G 9/047* | (2006.01) |

(52) U.S. Cl.
CPC ............... *H02N 2/18* (2013.01); *H02K 1/34* (2013.01); *H02K 7/09* (2013.01); *H02K 41/031* (2013.01); *H02N 2/0025* (2013.01); *H02N 2/108* (2013.01); *G05G 9/047* (2013.01); *G05G 2009/04766* (2013.01); *H02K 2201/18* (2013.01)

(58) Field of Classification Search
CPC ............. H02N 2/18; H02N 2/108; H02K 1/34
USPC ........... 310/156.36, 156.56, 268, 80, 82, 83, 310/90.5; 137/530; 324/155, 284, 302; 604/9

See application file for complete search history.

(56) References Cited

U.S. PATENT DOCUMENTS

| | | | | |
|---|---|---|---|---|
| 4,874,998 A | * | 10/1989 | Hollis, Jr. ................ | B23Q 5/28 310/166 |
| 5,565,891 A | * | 10/1996 | Armstrong ......... | G05G 9/04737 345/156 |
| 6,480,183 B1 | * | 11/2002 | Van Ruymbeke ..... | G05G 9/047 324/660 |

FOREIGN PATENT DOCUMENTS

| | | |
|---|---|---|
| DE | 197 22 814 A1 | 12/1998 |
| DE | 198 06 611 A1 | 8/1999 |
| EP | 0 347 846 A2 | 12/1989 |

(Continued)

*Primary Examiner* — Thomas Dougherty
*Assistant Examiner* — Karen B Addison
(74) *Attorney, Agent, or Firm* — Muncy, Geissler, Olds & Lowe, P.C.

(57) ABSTRACT

An electric motor device includes a rotor, a stator, and electrical means for driving rotation of the rotor relative to the stator, the device being characterized in that the stator includes a substantially spherical cavity receiving the rotor, which is itself substantially spherical, and in that the electrical means are arranged to drive the rotor in rotation about at least two axes.

17 Claims, 2 Drawing Sheets

(56) References Cited

FOREIGN PATENT DOCUMENTS

| | | |
|---|---|---|
| FR | 2 535 479 A1 | 5/1984 |
| GB | 2 330 457 A | 4/1999 |
| GB | 2 439 346 A | 12/2007 |
| JP | 2003 116255 A | 4/2003 |
| WO | WO 93/18475 A1 | 9/1993 |
| WO | WO 03/025394 A2 | 3/2003 |
| WO | WO 2007/113666 A2 | 10/2007 |

\* cited by examiner

MULTIAXIS DRIVE DEVICE AND CONTROL INSTRUMENT FITTED WITH SUCH A DEVICE

BACKGROUND OF THE INVENTION

Field of the Invention

The present invention relates to an electric motor device for moving an element in rotation about at least two axes that intersect at a point.

Description of Related Art

There exist motor devices that comprise a main structure in which a cradle is mounted for pivoting about a first axis. The cradle is connected to a first rotary motor driving the cradle to pivot about the first axis. A second rotary motor is fastened in the cradle to have an outlet shaft that extends along a second axis that is generally perpendicular to the first axis and that is connected to the element that is to be moved. The element can thus be moved in pivoting about both the first axis and the second axis.

Those motor devices present the drawback of having a structure that is relatively complex, bulky, and heavy. In addition, that structure is analogous to the structure of gimbals and does not allow the two axes to be independent unless a constant velocity joint is provided, thereby further increasing the complexity, the overall size, and the weight of the structure.

There exist other motor devices in which the first axis carries the second axis directly, together with the motor that is associated therewith and the element that is to be moved. The members carried by the first axis give rise to unbalance and inertia that are difficult to compensate. Such compensation is generally provided by an electronic correction circuit that is relatively complex.

BRIEF SUMMARY OF THE INVENTION

An object of the invention is to provide means for limiting the mechanical complexity of the motor device.

To this end, the invention provides an electric motor device comprising a rotor, a stator, and electrical means for driving rotation of the rotor relative to the stator. The stator includes a substantially spherical cavity receiving the rotor, which is itself substantially spherical, and the electrical means are arranged to drive the rotor in rotation about at least two axes.

The spherical structure of the rotor and of the cavity in the stator receiving the rotor allow the rotor to pivot in various independent orientations. In addition, the device presents relatively little inertia, is very compact, and is relatively light in weight.

In a first embodiment, the electrical means comprise electromagnetic elements and, advantageously, the rotor is fitted with at least two magnets with alternating polarization and the stator is fitted with at least one coil that is preferably controlled to move the rotor and to provide levitation for the rotor in the stator.

This embodiment of the drive means is particularly simple. The magnetic levitation of the rotor serves to limit friction.

In different variants:
the magnets form facets on the surface of the rotor, the stator having a plurality of coils arranged to guarantee an offset in position between the coils and the magnets, which magnets preferably have a rounded triangular shape and are grouped together in a hexagonal mesh for covering at least a portion of the rotor;
the magnets form half-quadrants at the surface of the rotor, the stator having a plurality of coils arranged to guarantee an offset in position between the coils and the magnets; and
there are two magnets, each in the form of a hemispherical cap, forming two opposite poles along a polar axis, and the stator has a single coil for orienting a magnetic flux along a preferred axis defining a return position for the rotor in which the polar axis coincides with the preferred axis.

In a second embodiment, the electrical means comprise piezoelectric elements arranged in pairs and controlled to give rise to creeping movement of said elements so as to move the rotor.

This embodiment is particularly advantageous in certain applications since the piezoelectric elements can be controlled to block the rotor in position.

According to a first particular characteristic, a processor circuit is contained in the rotor and the device includes a member for transmitting energy to the processor circuit and a member for exchanging data between the processor circuit and an external control unit.

In various implementations of this characteristic, applicable to either of the above embodiments, and possibly combinable between them:
the transmission member comprises at least one magnet mounted on the rotor, and the stator is provided with at least one coil for exciting the magnet, the magnet is surrounded by a detector coil connected to the processor circuit in such a manner that variation of the magnetic flux in the magnet gives rise to a potential difference being detected in the detection coil, which potential difference is used for powering the processor circuit;
the transmission member comprises at least one piezoelectric transmitter mounted on the stator and at least one piezoelectric receiver mounted on the rotor and connected to the processor circuit in order to power it under the effect of vibrations produced by the piezoelectric transmitters; and
the data exchange member comprises at least one piezoelectric transceiver mounted on the stator and connected to at least one stationary control unit, and at least one piezoelectric transceiver mounted on the rotor and connected to the processor circuit for exchanging data in the form of vibration.

According to a second particular characteristic, the device includes at least one detector for detecting the position of the rotor relative to the stator.

According to various implementations of this characteristic, which may possibly be combined with each other:
the sensor comprises at least one optical sensor and the rotor has a textured surface enabling the position of the rotor to be detected by reflection of a light beam; and
the rotor and the stator carry live elements distributed over their facing surfaces, and the sensor comprises a module for determining location by capacitive coupling.

The invention also provides a control instrument including such a motor device.

Other characteristics and advantages of the invention appear on reading the following description of particular non-limiting embodiments of the invention.

BRIEF DESCRIPTION OF THE SEVERAL VIEWS OF THE DRAWINGS

Reference is made to the accompanying drawings, in which.

DETAILED DESCRIPTION OF THE INVENTION

Figure 1:
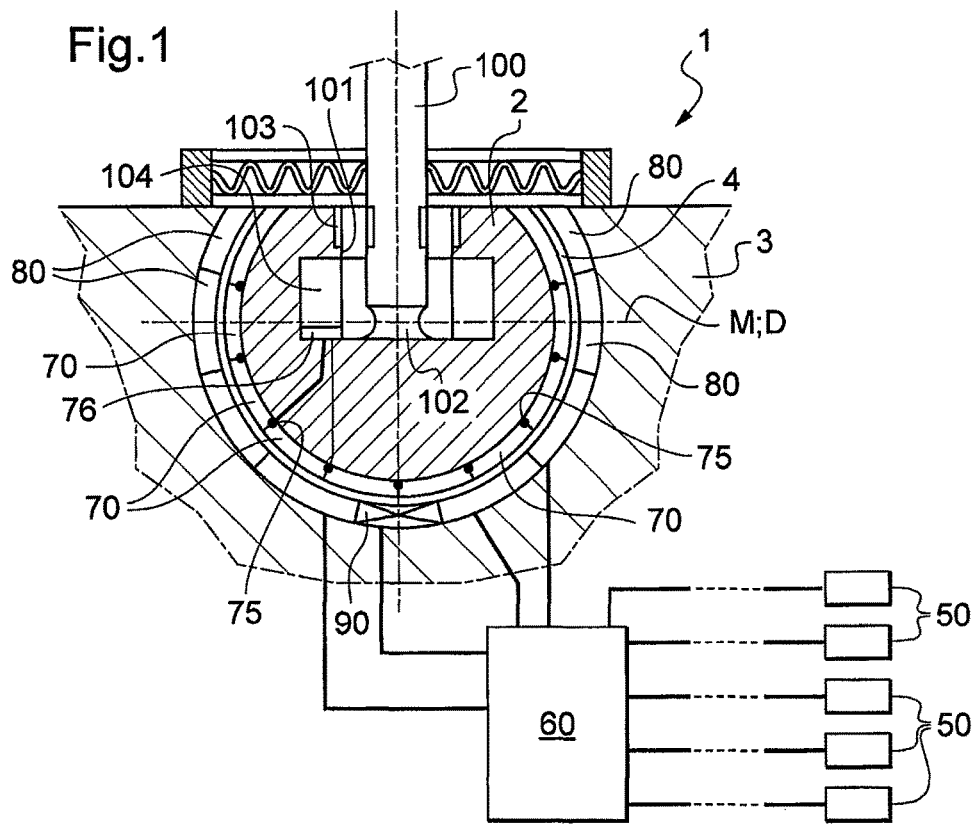
FIG. 1 is a diagrammatic section view of a control instrument in a first embodiment.

With reference to the figures, the control instrument in accordance with the invention is for use, for example, in controlling equipment of an aircraft, such as movable flight control surfaces of the aircraft, and it is arranged to allow force to be returned to the pilot.

The control instrument comprises a stick 100 connected by a transmission system to the movable flight (control) surfaces that are to be controlled.

The transmission system comprises a motor device given overall reference 1, actuators 50 for moving the movable surfaces, and a control unit 60 connected to the motor device and to the actuators.

The motor device has a rotor 2, a stator 3, and electrical means for driving rotation of the rotor 2 relative to the stator 3, as described in detail below. The electrical means for moving the rotor 2 are connected to the control unit 60, at least for the purpose of being controlled thereby.

The control unit 60 is itself known and comprises a processor, a memory containing at least one computer program executed by the processor, and an input/output module enabling it to be connected to the motor device, to the actuators 50, to sensors in particular for sensing the positions of the movable surfaces and for sensing the forces on the actuators 50, . . . . The control unit 60 is programmed in conventional manner in particular to control the actuators 50 of the movable surfaces as a function of movement imparted by the pilot to the stick 100 and to the rotor 2, and for controlling the motor device 1 for imparting resistance to the movement of the stick 100 as a function of a resistive force opposing the movement of the movable surfaces as detected at the actuators 50.

In accordance with the invention, the stator 3 has a substantially spherical cavity 4 receiving the rotor 2, which is itself substantially spherical.

The electrical means are arranged to drive the rotor 2 in rotation relative to the stator 3 about a plurality of axes M, only one of which is shown (an axis contained in the plane of the drawing sheet).

The stick 100 is secured to the rotor 2 and the axes M extend in a plane normal to the stick when the stick is in a neutral position.

In this example, the stick 100 has a bottom portion that is received in a housing 101 in the rotor 2 and that is fastened to the bottom of the housing 101 by a deformable portion 102 that allows the stick 100 to pivot about a plurality of axes (only one of which, referenced D, is shown herein) that are parallel to the axes M and that coincide with the axes M in this example. The deformable portion 102 in this example is a portion having a cross-section that is smaller than the cross-section of the remainder of the stick 100 and that allows the stick 100 to move angularly relative to the rotor 2 when a resistive force greater than a predetermined threshold is applied to the rotor 2 in order to oppose its movement.

In this example, the instrument has two sensors 103 for sensing the position of the stick 100 relative to the rotor 2 and a processor circuit 104 connected to the sensors 103 and incorporated in the rotor 2. By way of example, the sensors 103 are of the capacitive or inductive type and they are mounted on the edge defining the opening to the housing 101 facing a portion of the stick 100 in order to detect any modification in the distance between said portion and the sensor, each sensor sensing along one of the axes D (in this example the axis normal to the plane of the sheet of the figures). The axes of these sensors are perpendicular to one another. This movement depends on the force exerted on the stick 100 in the event of the rotor 2 being blocked, and it may be used for controlling the actuators 50.

The device has abutment means for limiting the angular movements of the stick 100. These abutments are not shown in the figures.

The instrument has means for transmitting energy or power to the processor circuit 104 and means for exchanging or transmitting data between the processor circuit 104 and the control unit 60, as explained below.

Figure 2:
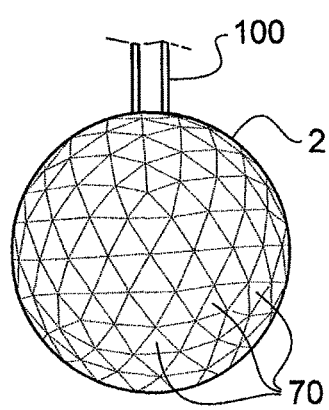
FIG. 2 is a diagrammatic elevation view of a rotor in accordance with the first embodiment.

With reference more particularly to FIGS. 1 and 2, and in accordance with a first embodiment, the electrical means comprise electromagnetic elements.

In this embodiment, the rotor 2 is covered in magnets 70 with alternating polarizations. In the surface of the rotor, the magnets 70 form facets of rounded triangular shape that are grouped together in a basic mesh of hexagonal and pentagonal patterns in order to cover the entire rotor 2 (on the geodesic principle).

The stator 3 has coils 80 arranged to guarantee an offset between the coils 80 and the magnets 70 regardless of the position of the rotor 2 relative to the stator 3. The coils 80 are connected to the control unit 60, which is arranged to control the coils 80 so as to ensure that the rotor 2 is levitated inside the stator 3 and so as to move the rotor 2. The number of poles and the way they are organized are calculated in a manner identical to that used for conventional brushless electric motors.

The means for powering the processor circuit 104 comprise a coil 75 that surrounds each magnet 70 and that is connected to an alternating-current/direct-current (AC/DC) converter 76 that is connected to the processor circuit 104. Thus, when the magnetic flux in the magnets 70 varies because of variations in the magnetic field from the coils 80 to which the magnets 70 are subjected, the coils surrounding the magnets 70 are subjected to potential differences that are used for powering the processor circuit 104. It is possible to connect groups of coils in series to the AC/DC converter.

In this example, the data exchange means comprise a carrier current data transceiver module connected to the control unit 60 and a carrier current data transceiver module connected to the processor circuit 104. These modules are themselves known. In a variant, it is possible to provide modules that communicate at radiofrequency, e.g. transponders.

The device also has optical detectors 90 for detecting the position of the rotor, the rotor having a textured outside surface enabling the position of the rotor 2 to be detected by reflecting a light beam that is emitted by the sensor. For this purpose, each detector 90 comprises a laser diode locally illuminating the outside surface of the rotor 2 and an image sensor associated with a lens and connected to a module for analyzing images delivered by the sensor at high frequency. The texture of the outside surface of the rotor 2 is the result in this embodiment of the presence of the lines of contact between the magnets 70 that give rise to discontinuities in the outside surface of the rotor 2. The device preferably has six detectors 90 arranged in pairs on three different axes in order to improve the accuracy of position detection and in order to provide redundancy that is advantageous in the event of a detector in one of the pairs of detectors failing.

The control and the operation of the motor of the invention are identical to the control and the operation of conventional rotary electric motors used in force return control devices that include a control instrument constrained to rotate with the rotors of such motors. In those devices, the motors are used both as sensors for sensing movements of the control instrument under the action of the pilot, and as members for producing a resistive force opposing the movements of the control instrument imparted by the pilot.

The coils 60 are preferably controlled by pulse width modulation (PWM).

It should be observed that the angular movement of the stick is limited in practice to a cone having its apex centered on the center of the rotor 2 and a half-angle at the apex of 20°. It is therefore possible to provide magnets 70 and coils 80 over only a portion of the rotor 2 and of the stator 3. Naturally, the invention may be adapted to angles of other values.

Figure 3:
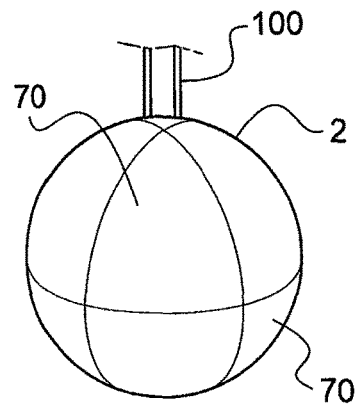
FIG. 3 is a perspective view of a rotor in a view variant.

In the variant of FIG. 3, the magnets 70 form half-quadrants of the surface of the rotor 2 and the stator 3 has a plurality of coils 80 arranged to guarantee an offset between the coils 70 and the magnets 80 regardless of the position of the rotor 2 relative to the stator 3.

The coils 80 are controlled in identical manner to that described above.

Figure 4:
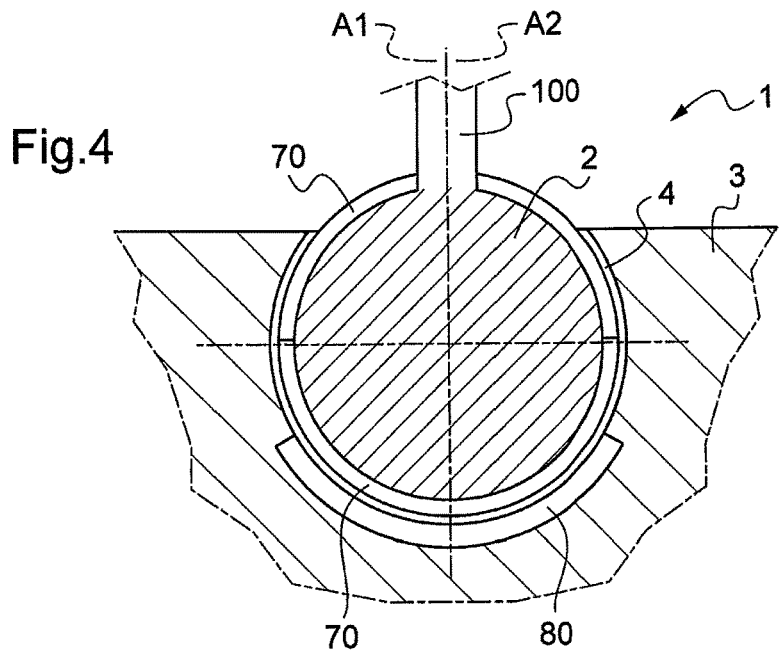
FIG. 4 is a view analogous to FIG. 1 showing a device in a second variant.

In the variant of FIG. 4, there are two magnets 70, each in the form of a hemispherical cap, forming two opposite poles along a polar axis A1 passing along the stick 100, and the stator 3 has a single coil for orienting magnetic flux along a reference axis A2 that defines a return position for the rotor in which the polar axis A1 coincides with the reference axis A2.

The motor device in this variant constitutes a passive motor reacting only when action of the pilot on the stick 100 has given rise to an offset between the polar axis A1 and the reference axis A2. The control unit 60 can modify the magnitude of the power fed to the coil in order to increase the force urging the rotor to return towards the return position.

In this example, the force relationship depends on the offset of the polar axis relative to the reference axis.

Figure 5:
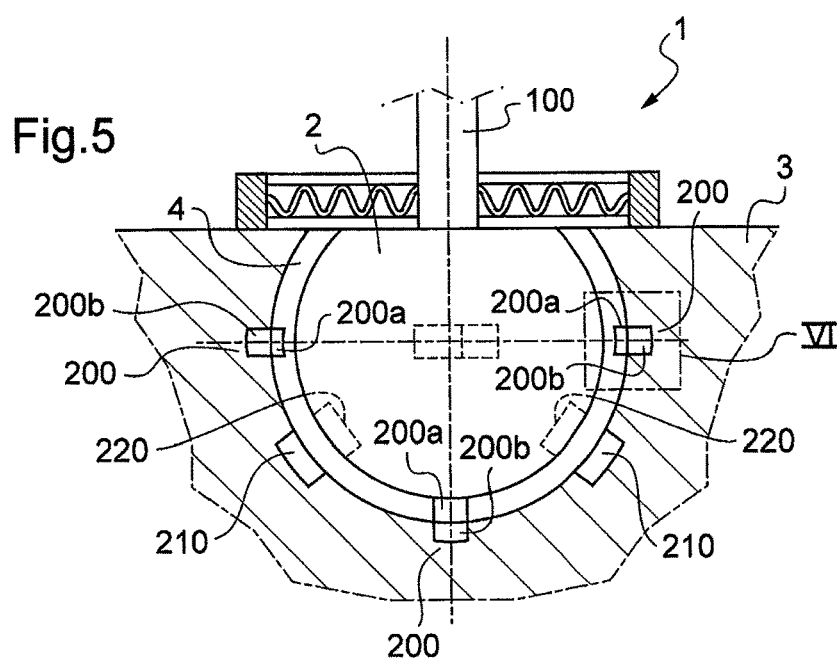
FIG. 5 is a diagrammatic section view of a control instrument in a second embodiment.
Figure 6:
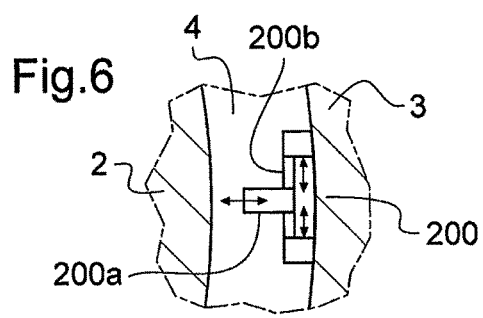
FIG. 6 is a diagrammatic view on a larger scale of a zone VI of FIG. 5.

In the second embodiment shown in FIGS. 5 and 6, the electrical means comprise piezoelectric elements 200 arranged in pairs and controlled to generate creeping movement of said elements 200 in order to move the rotor 2.

In this embodiment, the pairs of piezoelectric elements (two of which are shown diagrammatically) are secured to the stator 3, and each comprises an element 200a oriented so as to come into contact with the rotor 2 or so as to be retracted therefrom as a function of the voltage to which it is subjected, and an element 200b oriented along a direction that is tangential to the rotor 2 in order to have a portion that is suitable for being moved along said direction as a function of the voltage to which it is subjected. The pairs of piezoelectric elements are oriented in such a manner as to enable the rotor 2 to be moved in all directions. The piezoelectric elements are controlled in a manner that is conventional in the field of piezoelectric actuators. Advantageously, the piezoelectric elements 200a can be held in the contacting position in order to block the rotor 2 in position. Thus blocking in position may be provided either in the absence of any power supply, or else when under power.

The power supply means of the processor circuit 104 comprise a piezoelectric transceiver 210 mounted on the stator 3 and connected to the control unit 60 and a piezoelectric transceiver 220 mounted on the rotor 2 and connected to the processor circuit 104 in order to power it under the effect of vibrations produced by the piezoelectric transceivers 210.

The control unit 60 and the processor circuit 104 are also arranged to control the piezoelectric transceiver 210 and the piezoelectric transceiver 220 respectively in order to exchange data in the form of vibrations. The transceivers 210 and 220 are preferably mounted in three-dimensional (3D) quadrature in order to avoid crosstalk. The data is preferably encoded using hi-phase modulation in order to conserve a mean component of zero.

The energy of the vibrations used for exchanging data is also used for powering the processor circuit 104. The bi-phase modulation is configured so as to guarantee a constant level of emitted power regardless of message content so as to ensure that the processor circuit 104 continues to be powered.

The cavity of the stator 3 is preferably filled with a lubricating liquid that also serves to transmit the vibrations between the rotor 2 and the stator 3.

Naturally, the invention is not limited to the embodiments described but covers any variant coming within the ambit of the invention as defined by the claims.

In particular, it is possible to give precedence to certain axes, e.g. by providing a gate for guiding the stick that imparts the movements.

It is also possible to have an additional axis, and more particularly, the axis that coincides with the axis of the stick 100.

The control instrument may have force sensors of a type other than those described, and for example strain gauges.

The stick may be connected to the rotor via a portion that is not deformable. In which case it is advantageous for there to be no electronics mounted on the rotor so as to avoid the need for means for transmitting energy or exchanging data.

In a variant, the part for transmitting energy and the part for exchanging data may be identical or they may be different.

The invention claimed is:
1. An electric motor device comprising:
   a substantially spherical rotor fitted with magnets with alternative polarization, the magnets forming facets on a surface of the rotor, the magnets having a shape of rounded triangles and being grouped together in a hexagonal mesh for covering at least a portion of the rotor;
   a stator, comprising:
      a substantially spherical cavity receiving the rotor; and
      a plurality of coils arranged to guarantee an offset in position between the plurality of coils and the at least two magnets; and
   electrical means for driving rotation of the rotor relative to the stator, the electrical means arranged to drive the rotor in rotation about at least two axes, and the electrical means comprises electromagnetic elements.

2. A device according to claim 1, wherein the plurality of coils is controlled to move the rotor and to provide levitation for the rotor in the stator.

3. A device according to claim 1, wherein a processor circuit is contained in the rotor and wherein the device includes a member for transmitting energy to the processor circuit and a member for exchanging data between the processor circuit and an external control unit.

4. A device according to claim 3, wherein the transmission member comprises at least one magnet mounted on the rotor, and the stator is provided with at least one coil for exciting the magnet, the magnet is surrounded by a detector coil connected to the processor circuit in such a manner that variation of the magnetic flux in the magnet gives rise to a potential difference being detected in the detection coil, which potential difference is used for powering the processor circuit.

5. A device according to claim 3, wherein the transmission member comprises at least one piezoelectric transmitter mounted on the stator and at least one piezoelectric receiver mounted on the rotor and connected to the processor circuit in order to power it under the effect of vibrations produced by the piezoelectric transmitters.

6. A device according to claim 3, wherein the data exchange member comprises at least one piezoelectric transceiver mounted on the stator and connected to at least one stationary control unit, and at least one piezoelectric transceiver mounted on the rotor and connected to the processor circuit for exchanging data in the form of vibration.

7. A device according to claim 6, wherein the data exchange member is arranged to exchange data over a bi-phase link.

8. A device according to claim 1, including at least one detector for detecting the position of the rotor relative to the stator.

9. A device according to claim 8, wherein the detector comprises at least one optical sensor and the rotor has a textured surface enabling the position of the rotor to be detected by reflection of a light beam.

10. A device according to claim 8, wherein the rotor and the stator carry live elements distributed over their facing surfaces, and the sensor comprises a module for determining location by capacitive coupling.

11. A device according to claim 1, wherein the cavity is filled with a lubricating liquid.

12. A control instrument including a motor device according to claim 1, and a control stick projecting from the rotor.

13. An instrument including a motor device according to claim 12, wherein the stick is mounted on the rotor to pivot about at least one axis, the instrument including at least one position sensor for sensing the position of the stick relative to the rotor and an internal processor circuit connected to the sensor and incorporated in the rotor.

14. An instrument according to claim 13, including a transmission member for transmitting energy to the processor circuit and a member for exchanging data between the internal processor circuit and an external control unit.

15. An instrument according to claim 14, wherein the transmission member comprises at least one magnet mounted on the rotor, and the stator is provided with at least one coil for exciting the magnet, the magnet is surrounded by a coil connected to the processor circuit in such a manner that a variation of the magnetic flux in the magnet generates a potential difference in the coil, which potential difference is used for powering the processor circuit.

16. An instrument according to claim 14, wherein the transmission member comprises at least one piezoelectric transmitter mounted on the stator and at least one piezoelectric receiver mounted on the rotor and connected to the processor circuit to power it under the effect of vibrations produced by the piezoelectric transmitters.

17. A device according to claim 14, wherein the transmission member comprises at least one piezoelectric transceiver mounted on the stator and connected to at least one stationary control unit, and at least one piezoelectric transceiver mounted on the rotor and connected to the processor circuit to exchange data in the form of vibration.

* * * * *